(12) United States Patent
Shin et al.

(10) Patent No.: US 9,335,861 B2
(45) Date of Patent: May 10, 2016

(54) TOUCH SENSING SYSTEM AND DRIVING METHOD THEREOF, AND DISPLAY DEVICE USING THE TOUCH SENSING SYSTEM

(71) Applicant: LG Display Co., Ltd., Seoul (KR)

(72) Inventors: Myungho Shin, Gyeonggi-do (KR); Dongkyun Lim, Gyeonggi-do (KR); Seunghwan Yoon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/519,357

(22) Filed: Oct. 21, 2014

(65) Prior Publication Data

US 2015/0109227 A1    Apr. 23, 2015

(30) Foreign Application Priority Data

Oct. 21, 2013   (KR) .......................... 10-2013-0125190

(51) Int. Cl.
*G06F 3/044*      (2006.01)
*G06F 3/041*      (2006.01)

(52) U.S. Cl.
CPC .............. *G06F 3/0416* (2013.01); *G06F 3/044* (2013.01)

(58) Field of Classification Search
None
See application file for complete search history.

(56) References Cited

U.S. PATENT DOCUMENTS

| 2008/0042992 A1* | 2/2008 | Kim ...................... G06F 3/0416 345/173 |
| 2008/0218489 A1* | 9/2008 | Park ....................... G06F 3/044 345/173 |
| 2013/0050116 A1 | 2/2013 | Shin et al. |
| 2013/0241859 A1* | 9/2013 | Saitoh .................... G06F 3/041 345/173 |

* cited by examiner

*Primary Examiner* — Jason Olson
*Assistant Examiner* — Krishna Neupane
(74) *Attorney, Agent, or Firm* — Morgan, Lewis & Bockius LLP (57) ABSTRACT

A touch sensing system and a driving method thereof are provided. The touch sensing system includes: a touch screen drive circuit which senses a change in the amount of electric charge in touch sensors during a sensing period, generates raw data and temporarily stores it in a buffer memory, transmits the raw data read out from the buffer memory to an algorithm execution unit during a raw data transmission period, and calculates the coordinates of touch input by the algorithm execution unit during an algorithm execution period. The touch screen drive circuit controls the amount of data stored in the buffer memory and the start timing of a read operation to make the sensing period and the raw data transmission period overlap each other.

18 Claims, 9 Drawing Sheets

TOUCH SENSING SYSTEM AND DRIVING METHOD THEREOF, AND DISPLAY DEVICE USING THE TOUCH SENSING SYSTEM

This application claims the benefit of Korea Patent Application No. 10-2013-0125190 filed on Oct. 21, 2013, which is incorporated herein by reference for all purposes as if fully set forth herein.

BACKGROUND OF THE INVENTION

1. Field of the Invention

This document relates to a touch sensing system and a driving method thereof.

2. Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technologies have continuously evolved to increase user's sensibility and handling convenience. The user interface has been recently developed to include touch UI, voice recognition UI, 3D UI, etc.

The touch UI has been necessarily used in portable information appliances. The touch UI has been implemented by a method for forming a touch screen on the screen of a display device. A capacitive touch screen detects touch input by sensing a change in capacitance, i.e., a change in the amount of electric charge in a touch sensor, when a finger or conductive material touches a touch sensor.

In order to increase the touch sensitivity of the touch UI, it is necessary to increase touch report rate. The touch report rate is a velocity (Hz) at which coordinate data obtained by sensing all touch sensors present within a touch screen TSP. The higher the touch report rate, the less the time gap between the actual timing of touch input and the input response time and the higher the touch sensitivity that a user feels.

Figure 1:
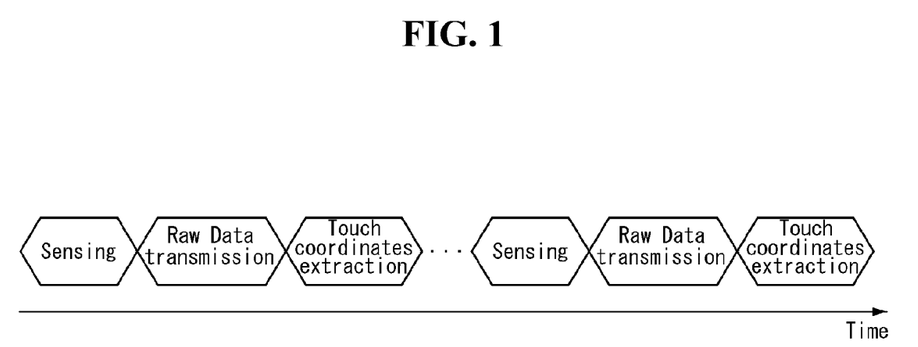
FIG. 1 is a view showing an operation sequence of a related art touch sensing system.

As shown in FIG. 1, a related art touch sensing system applies a drive signal to all touch sensors within a touch screen during a sensing period, senses a change in the amount of electric charge in the touch sensors, generates N frames (N is a positive integer) of raw data, transmits the N frames of raw data to an external algorithm execution unit during a raw data transmission period, and then analyzes the N frames of raw data to calculate the coordinates of a touch input position during an algorithm execution period. Next, the related art touch sensing system applies a drive signal to all the touch sensors within the touch screen during a sensing period, senses a change in the amount of electric charge in the touch sensors, generates (N+1) frames of raw data, transmits the (N+1) frames of raw data to the external algorithm execution unit during a raw data transmission period, and then analyzes the (N+1) frames of raw data to calculate the coordinates of a touch input position during an algorithm execution period. An algorithm for coordinate calculation is executed after waiting an amount of time equal to the sum of the sensing period of all the touch sensors and a raw data transmission period. Accordingly, it is difficult to improve touch rate report and reduce latency in the related art. Latency refers to the time it takes from the touch sensing start time until the transmission of coordinate information of touch input to a host system.

SUMMARY OF THE INVENTION

Accordingly, the present invention is directed to a touch sensing system and driving method thereof that substantially obviates one or more of the problems due to limitations and disadvantages of the related art.

An object of the present invention is to provide a touch sensing system that improves touch report rate and reduces latency and a driving method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposed of the present invention, as embodied and broadly described, a touch sensing system according to an exemplary embodiment of the present invention comprises: a touch screen drive circuit which senses a change in the amount of electric charge in touch sensors during a sensing period, generates raw data and temporarily stores it in a buffer memory, transmits the raw data read out from the buffer memory to an algorithm execution unit during a raw data transmission period, and calculates the coordinates of touch input by the algorithm execution unit during an algorithm execution period.

In another aspect, driving method of a touch sensing system according to another exemplary embodiment of the present invention comprises: sensing a change in the amount of electric charge in touch sensors during a sensing period, generating raw data, and temporarily storing the same in a buffer memory; transmitting the raw data read out from the buffer memory to an algorithm execution unit during a raw data transmission period; and analyzing the raw data to calculate the coordinates of touch input by the algorithm execution unit during an algorithm execution period.

In the touch sensing system and the driving method thereof, the amount of data stored in the buffer memory and the start timing of a read operation are controlled to make the sensing period and the raw data transmission period overlap each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Hereinafter, exemplary embodiments of the present invention will be described in detail with reference to the accompanying drawings. Throughout the specification, like reference numerals denote substantially like components. Hereinafter, the detailed description of related known functions or configurations that may unnecessarily obscure the subject matter of the present invention in describing the present invention will be omitted.

With reference to FIGS. 2 to 7, a touch sensing system of the present invention comprises a touch screen TSP, a touch screen drive circuit, etc.

Figure 4:
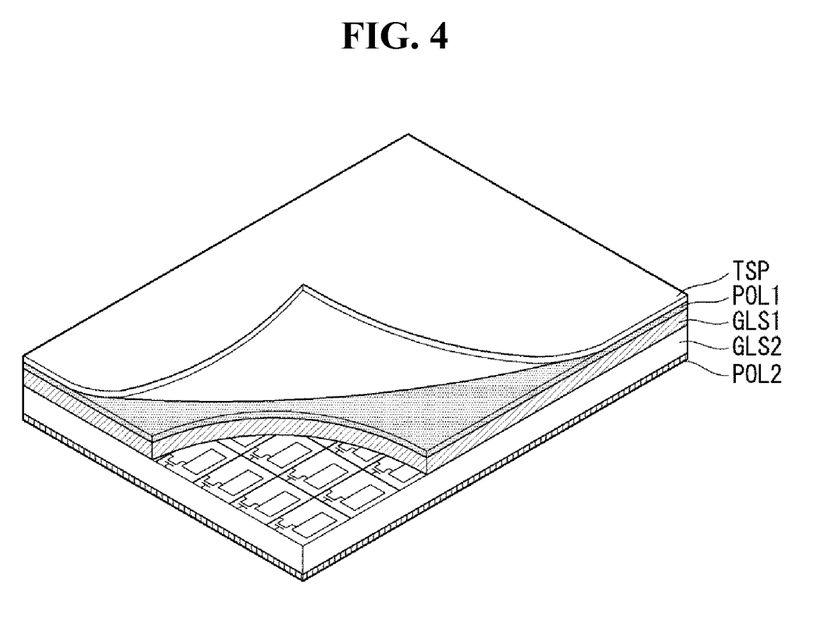
FIGS. 4 to 6 are views showing various combinations of a touch screen and a display panel.
Figure 5:
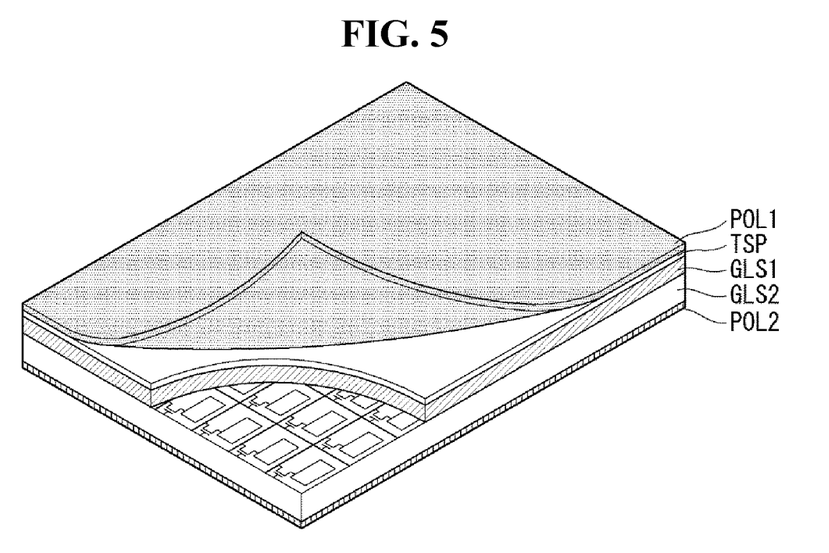
Figure 6:
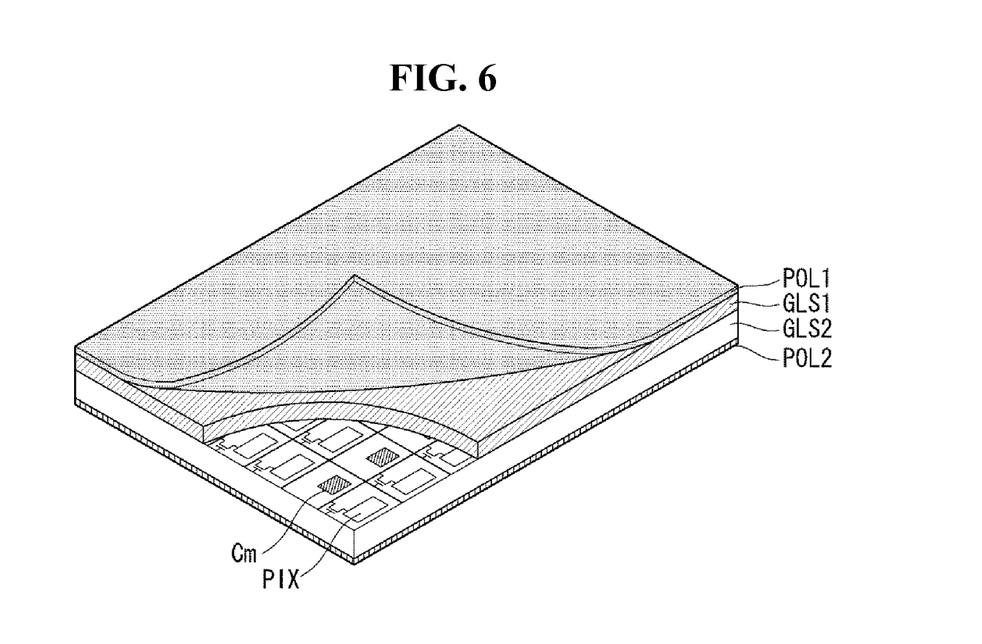

The touch screen TSP may be bonded onto an upper polarizer POL1 of a display panel DIS, as shown in FIG. 4, or formed between the upper polarizer POL1 and upper substrate GLS1 of the display panel DIS, as shown in FIG. 5. As shown in FIG. 6, touch sensors on the touch screen TSP may be embedded in the in-cell type in a lower substrate, along with a pixel array, within the display panel DIS. In FIGS. 4 to 6, 'PIX' refers to a pixel electrode of a liquid crystal cell, 'GLS2' refers to the lower substrate, and 'POL2' refers to a lower polarizer.

A display device of the present invention may be implemented as a flat panel display device, such as a liquid crystal display (LCD), a field emission display (FED), a plasma display panel (PDP), an organic light emitting display (OLED), or an electrophoresis display (EPD). In an exemplary embodiment that follows, it should be noted that, although an organic light emitting diode display will be described as an example of the flat panel display device, the display device of the present invention is not limited to this example.

Figure 2:
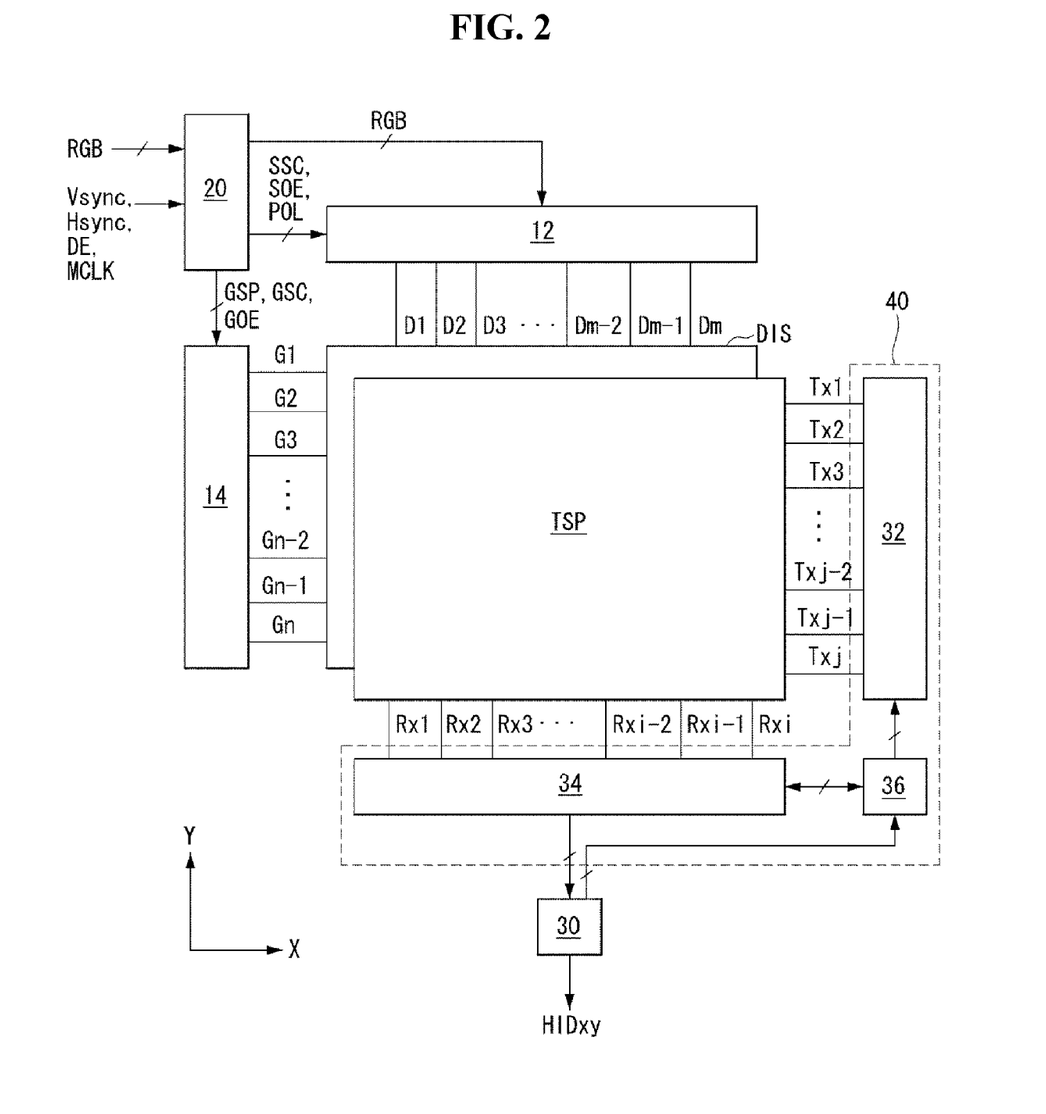
FIG. 2 is a block diagram showing a touch sensing system according to an exemplary embodiment of the present invention.

The display panel DIS includes a liquid crystal layer formed between two glass substrates. The lower substrate of the display panel DIS comprises a plurality of data lines D1 to dm (m is a positive integer), a plurality of gate lines G1 to Gn (n is a positive integer) crossing the data lines D1 to Dm, a plurality of TFTs (thin film transistors) formed at the crossings of the data lines D1 to Dm and the gate lines G1 to Gn, a plurality of pixel electrodes for charging liquid crystal cells with a data voltage, and storage capacitors connected to the pixel electrodes to maintain the voltage of the liquid crystal cells.

Pixels on the display panel DIS are formed in pixel regions defined by the data lines D1 to Dm and the gate lines G1 to Gn and arranged in a matrix. The liquid crystal cell of each pixel is driven by an electric field generated by a data voltage applied to the pixel electrodes and a common voltage applied to a common electrode and adjusts the transmittance of incident light. The TFTs are turned on in response to a gate pulse from the gate lines G1 to Gn and supply a voltage from the data lines D1 to DM to the pixel electrodes.

A black matrix, color filters, etc may be formed on the upper substrate of the display panel DIS. The lower substrate of the display panel DIS may be implemented to have a COT (Color filter On TFT) structure. In this case, the color filters may be formed on the lower substrate of the display panel DIS.

Polarizers are attached on the upper and lower substrates of the display panel DIS, and an alignment film for setting a pre-tilt angle of liquid crystal is formed on the inner surface contacting the liquid crystal. A column spacer for sustaining a cell gap of the liquid crystal layer is formed between the upper and lower substrates of the display panel DIS.

The display panel DIS may be implemented in any well-known liquid crystal mode, such as a TN (Twisted Nematic) mode, a VA (Vertical Alignment) mode, an IPS (In-Plane Switching) mode, and an FFS (Fringe Field Switching) mode. A backlight unit may be arranged on the back surface of the display panel DIS. The backlight unit is implemented as an edge type backlight unit or a direct type backlight unit to irradiate light to the display panel DIS.

A display drive circuit comprises a data drive circuit 12, a scan drive circuit 14, and a timing controller 20, and writes video data of an input image to the pixels.

The data drive circuit 12 converts digital video data RGB received from the timing controller 20 into an analog positive/negative gamma compensation voltage, and outputs a data voltage to the data lines D1 to Dm. A scan drive circuit 14 sequentially supplies a gate pulse (or scan pulse) synchronized with the data voltage to the gate lines G1 to Gn and selects lines of the display panel DIS to which data is written.

The timing controller 20 receives timing signals, such as a vertical synchronization signal Vsync, a horizontal synchronization signal Hsync, a data enable signal DE, and a main clock MCLK from a host system (not shown). The timing controller 20 generates a scan timing control signal for controlling the operation timing of the scan drive circuit 14 and a data timing control signal for controlling the operation timing of the data drive circuit 12. The scan timing control signal comprises a gate start pulse GSP, a gate shift clock, a gate output enable signal GOE, etc. The data timing control signal comprises a source sampling clock SSC, a polarity control signal POL, a source output enable signal SOE, etc.

The host system may be connected to external video source equipment, for example, a navigation system, a set-top box, a DVD player, a Blue-ray player, a personal computer (PC), a home theater system, a broadcast receiver, and a phone system, and receive video data from the external video source equipment. The host system converts the video data from the external video source equipment into a format suitable for displaying it on the display panel DIS. The host system runs an application program associated with coordinate data HIDxy received from the algorithm execution unit 30.

Figure 3:
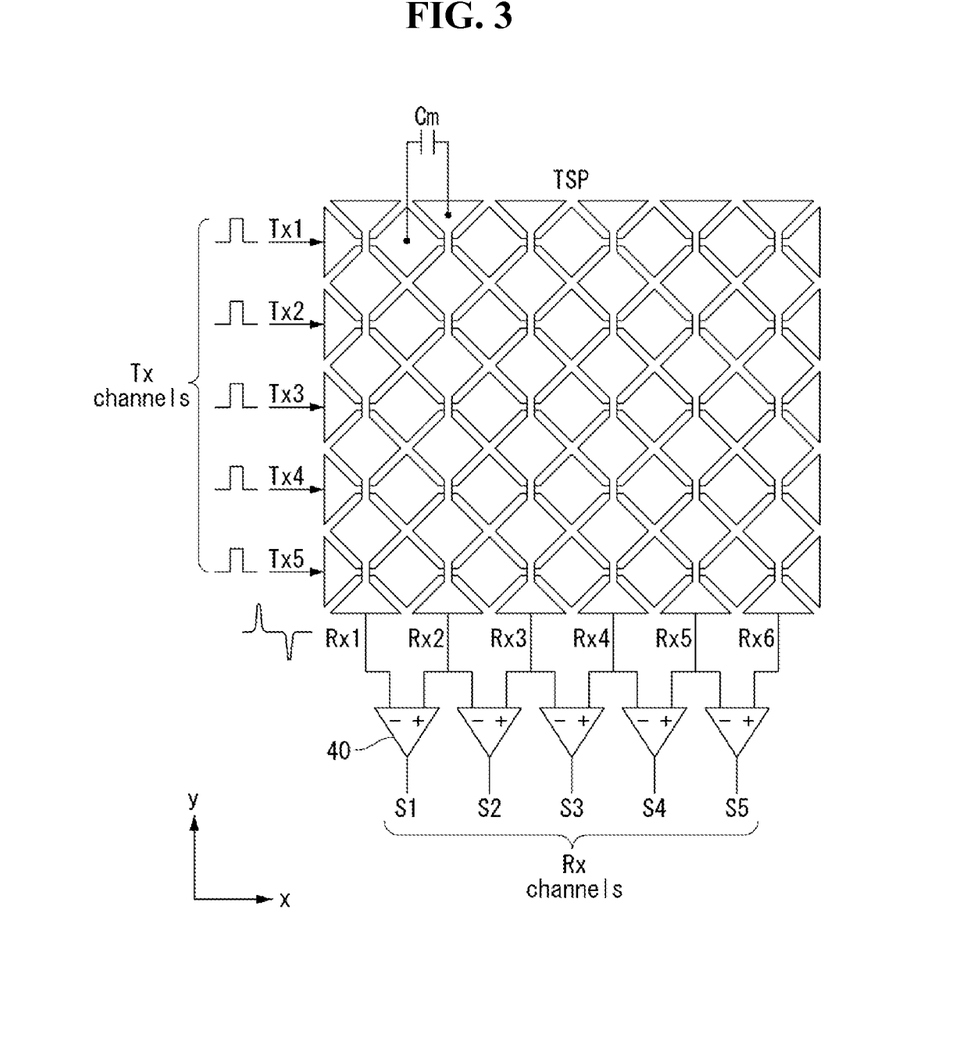
FIG. 3 is a partial enlarged top plan view of the touch screen of FIG. 2.

A mutual capacitance touch screen TSP comprises Tx lines T1 to Tj (j is a positive integer less than n and greater than or equal to 2), Rx lines Rxi to Rxi (i is a positive integer less than m and greater than 2) crossing the Tx lines T1 to Tj, and touch sensors Cm formed between the Tx lines T1 to Tj and the Rx lines Rx1 to Rxi. Each of the touch sensors Cm has a mutual capacitance formed between a Tx line and an Rx line. The touch sensing system detects a touch of a conductive material such as a finger and the position of the touch by sensing a change in the amount of electric charge in the touch sensors before and after the touch. The mutual capacitance touch screen TSP supplies a drive signal to the Tx lines T1 to Tj, and individually senses changes in the capacitance of each of the touch sensors through the Rx lines in synchronization with the drive signal. In the mutual capacitance touch screen, the Tx lines T1 to Tj, to which the drive signal is supplied, are separated from the Rx lines Rx1 to Rxi, which receive touch sensor signals. The drive signal has been illustrated as taking the form of a drive signal for ease of description, but not limited thereto. For example, the drive signal may be generated in various forms including a square wave pulse, a sine wave pulse, a triangle wave pulse, etc.

The touch screen drive circuit comprises a Tx drive circuit 32, an Rx drive circuit 34, a touch timing controller 36, and an algorithm execution unit 30. The touch screen drive circuit supplies a driving signal to the Tx lines T1 to Tj and senses a touch sensor signal through the Rx lines Rxi to Rxi in synchronization with the drive signal. The Tx drive circuit 32, the Rx drive circuit 34, and the touch timing controller 36 may be integrated in a single readout integrated circuit (ROIC) chip 40. The algorithm execution unit 30 may be implemented as an MCC (Micro Controller Unit).

The touch screen drive circuit sequentially applies a drive signal to the Tx lines Txi to Txj, receives a touch sensor signal through the Rx lines Rxi to Rxi in synchronization with the drive signal, and converts a change in the amount of electric charge in the touch sensors before and after a touch into digital data to generate raw data. The touch screen drive circuit then analyzes the raw data and transmits a touch report containing coordinate data HIDxy on each touch input to the host system.

As suggested in U.S. patent application Ser. No. 13/590385 (2012. 8. 21) filed by the present inventor, the touch screen drive circuit may drive the touch screen TSP in two steps comprising a group sensing step of sensing all of the touch sensors within the touch screen TSP in groups of a certain size and a partial sensing step of precisely sensing only groups of touch sensors that have detected touch input and detecting a touch input position.

Figure 7:
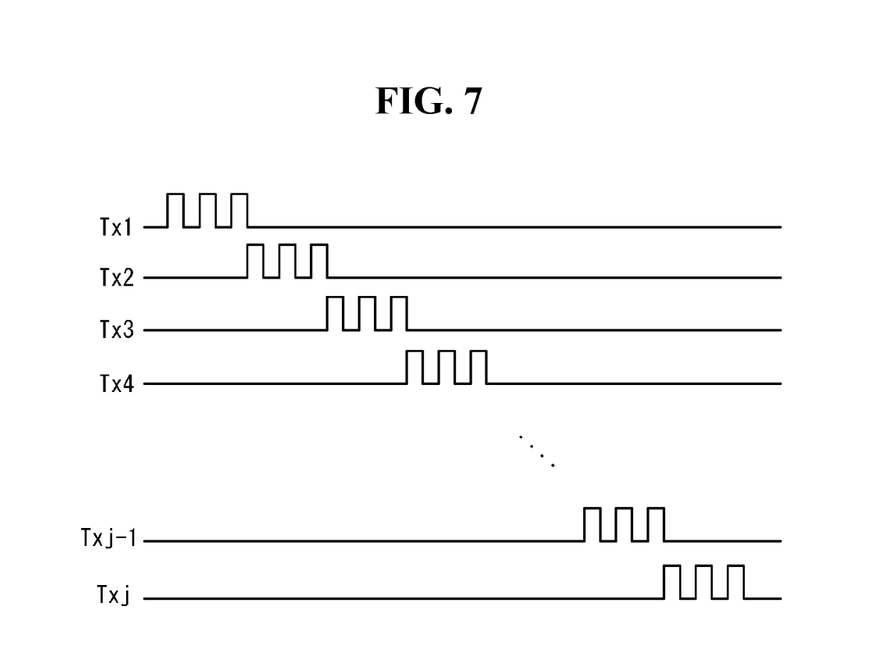
FIG. 7 is a flowchart showing a driving method of a touch sensing system according to an embodiment of the present invention.

The Tx drive circuit 32 selects Tx lines to be supplied with a drive signal in response to a Tx setup signal input from the touch controller 36, and as shown in FIG. 7, sequentially supplies the drive signal to the Tx lines T1 to Tj. In the present invention, a change in the amount of electric charge in the touch sensors before and after a touch can be increased by repetitively accumulating the voltages of the touch sensors Cm N times (N is a positive integer greater than or equal to 2) and charging a capacitor of the Rx drive circuit 34 with the accumulated voltage. To this end, the drive signal applied to each of the Tx lines T1 to Tj may include N drive signals which are generated at predetermined time intervals. In this case, N drive signals successively supplied to each of the touch sensors Cm.

The Rx drive circuit 34 selects Rx lines to receive a touch sensor signal in response to an Rx setup signal input from the touch timing controller 36. The Rx drive circuit 34 samples the received touch sensor signal. The Rx drive circuit 34 converts the sampled touch sensor signal into digital data using an analog-to-digital converter (ADC) to output touch raw data. The Rx drive circuit 34 may receive touch sensor signals simultaneously through two or more Rx lines or a touch sensor signal through one Rx line, and then receive a touch sensor signal through the next Rx line. The raw data output from the Rx drive circuit 34 is temporarily stored in a buffer memory shown in FIG. 8. The raw data stored in the buffer is read out under control of the touch timing controller 36 and transmitted to the algorithm execution unit 30.

Figure 8:
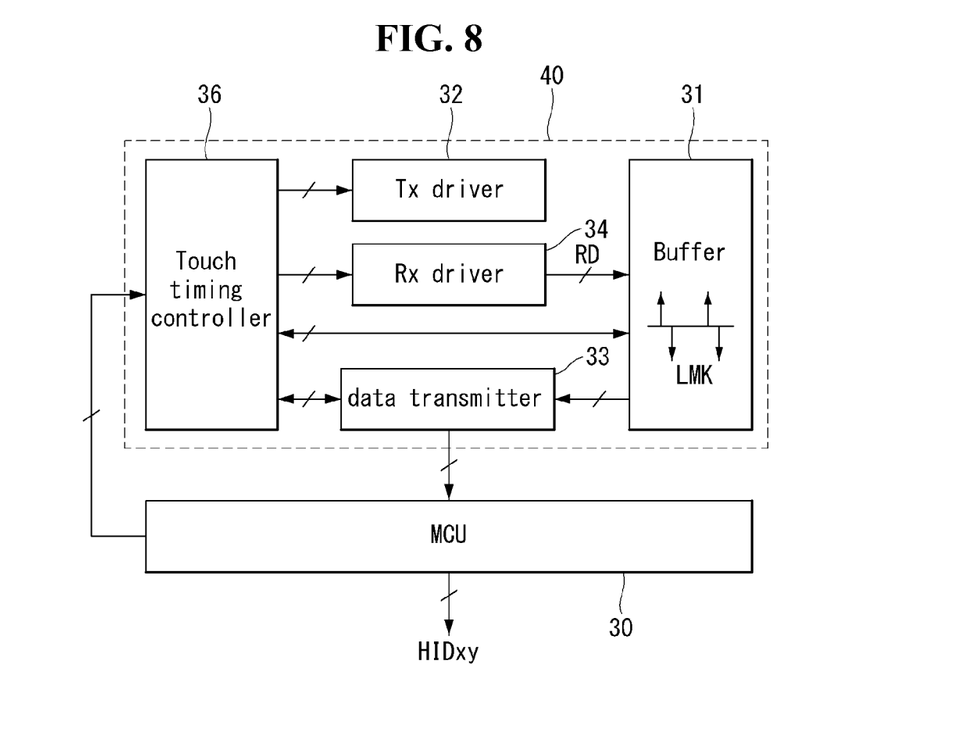
FIG. 8 is a block diagram showing a buffer memory and data transmitter on a touch screen drive circuit.

The touch timing controller 36 controls a Tx channel setup of the Tx drive circuit 32, an Rx channel setup of the Rx drive circuit 34, a touch sensor signal sampling timing of the Rx drive circuit 34, an analog-to-digital conversion timing of the Rx drive circuit 34, etc. As shown in FIG. 8, the touch timing controller 36 may control the timing of raw data transmission and vary it by controlling the write and read timings of the buffer memory 31.

The algorithm execution unit 30 analyzes raw data, compares a touch sensor signal variation before and after a touch with a predetermined threshold value, determines that the raw data is data of a touch input position if the signal variation is greater than or equal to the threshold value, and calculates the coordinates of the touch input position. The algorithm execution unit 30 then transmits coordinate data HIDxy to the host system.

Figure 9:
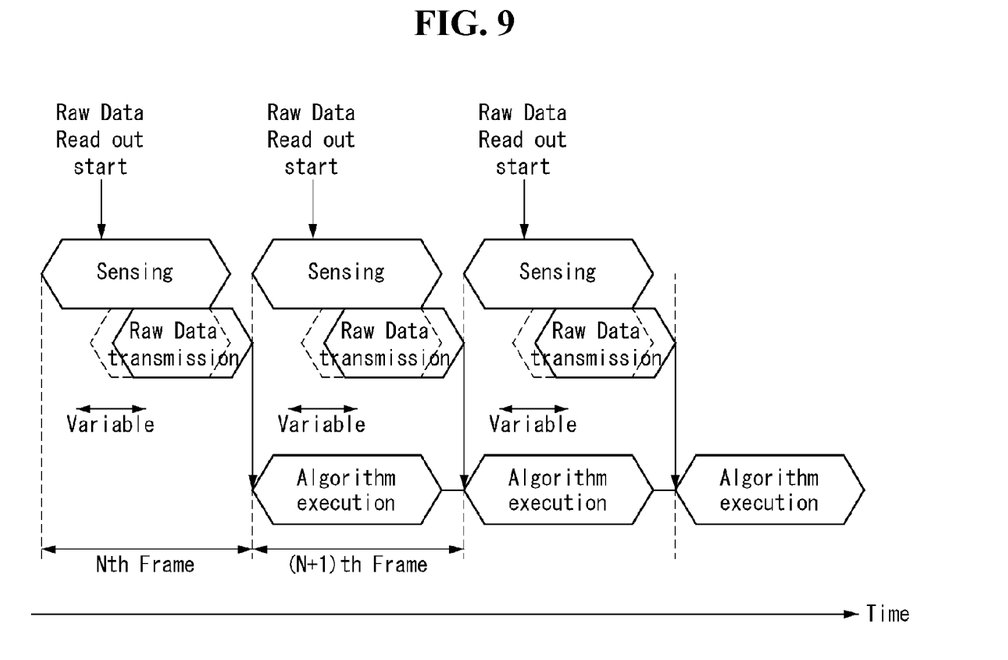
FIGS. 9 and 10 are views showing an operation sequence of a touch sensing system according to an exemplary embodiment of the present invention.
Figure 12:
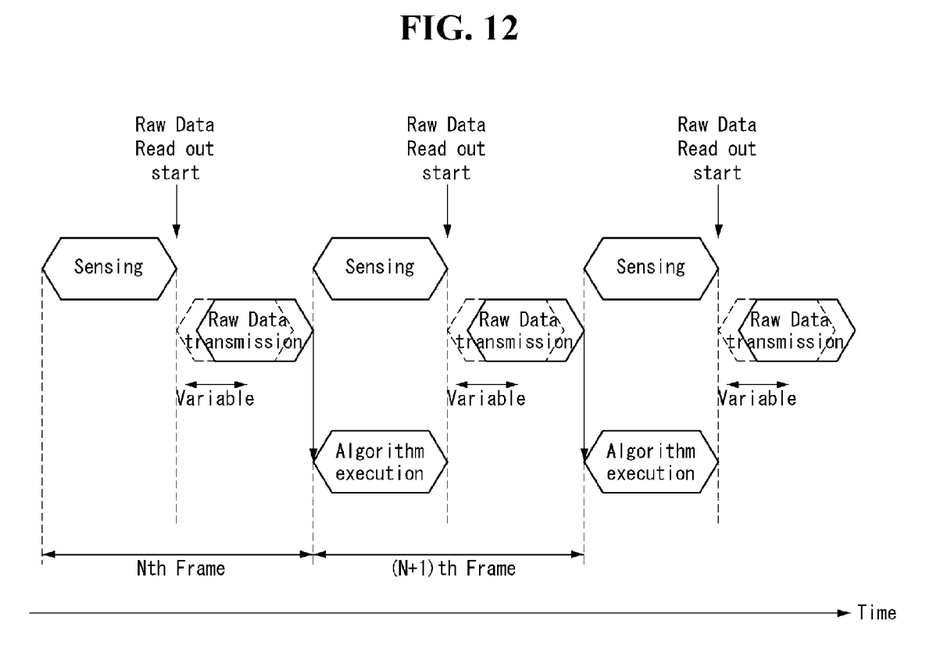
FIG. 12 is a view showing another example of variations in the timing of raw data transmission.

The algorithm execution unit 30 transmits a store level mark signal (LMK) for controlling the amount of data stored in the buffer memory 31 to the touch timing controller 36 and controls the timing of data transmission. Accordingly, the algorithm execution unit 30 may vary the amount of data stored in the buffer memory and the start timing of a data read operation. As shown in FIGS. 9 and 12, the algorithm execution unit 30 may control a sensing operation, a raw data transmission operation, and an algorithm execution operation in parallel or in series by using the LMK signal.

By controlling the amount of storage in the buffer memory and data transmission rate, the touch sensing system of the present invention can transmit raw data to the algorithm execution unit during a sensing period for sensing a change in the amount of electric charge in the touch sensors, as shown in FIG. 9, thereby improving touch report rate and reducing latency.

FIG. 8 is a block diagram showing a buffer memory and data transmitter of a touch screen drive circuit.

With reference to FIG. 8, the touch screen drive circuit further comprises a buffer memory 31 and a data transmitter 33.

The touch timing controller 36 receives an LMK signal from the algorithm execution unit 30 and controls the amount of data stored in the buffer memory 31. When raw data is stored to an address designated by the LMK, the buffer memory 31 transmits the raw data to the data transmitter 33 in a first-in first out order. The data transmitter 33 transmits a synchronization signal to the algorithm execution unit 30 to notify the host system 30 of the start timing of data transmission, and then starts the transmission of the raw data received from the buffer memory 31. The host system 30 may control the amount of data stored in the buffer memory 31 and the timing of raw data transmission by using the LMK.

Figure 10:
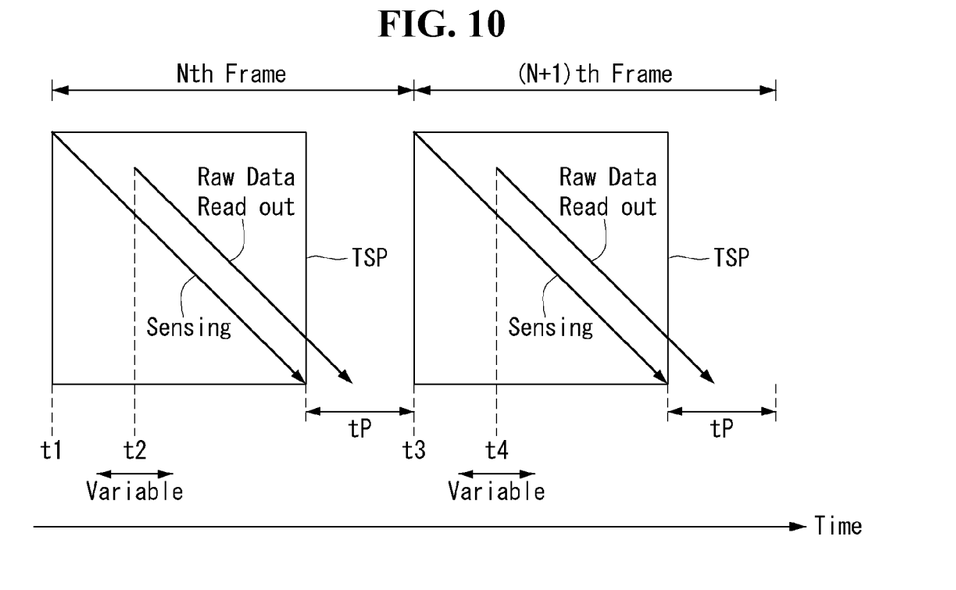

FIGS. 9 and 10 are views showing an operation sequence of a touch sensing system according to an exemplary embodiment of the present invention.

With reference to FIGS. 9 and 10, the touch sensing system of the present invention senses a change in the amount of electric charge in the touch sensors during an Nth sensing period and generates N frames of raw data. The touch sensing system temporarily stores the raw data in the buffer memory 31, reads out the N frames of raw data from the buffer memory 31 and transmits them to the algorithm execution unit 30 during an Nth raw data transmission period partially overlapping the Nth sensing period, and then analyzes the N frames of raw data to calculate the coordinates of a touch input position during an Nth algorithm execution period. Accordingly, the touch sensing system of the present invention can improve touch report rate and reduce latency by processing the sensing and raw data transmission operations of the touch sensors in parallel. The Nth algorithm execution period overlaps an (N+1)th sensing period and (N+1)th raw data transmission period for obtaining (N+1) frames of raw data.

The touch sensing system senses a change in the amount of electric charge in the touch sensors and generates (N+1) frames of raw data during the (N+1)th sensing period. The touch sensing system transmits the (N+1) frames of raw data to the algorithm execution unit 30 during the (N+1)th raw data transmission period partially overlapping the (N+1)th sensing period, and then analyzes the (N+1) frames of raw data to calculate the coordinates of a touch input position during an (N+1)th algorithm execution period.

In FIG. 9, 'Raw Data Readout start' is the timing at which raw data starts to be read out from the buffer memory 31 when the raw data in the buffer memory 31 reaches a store level mark.

Figure 11:
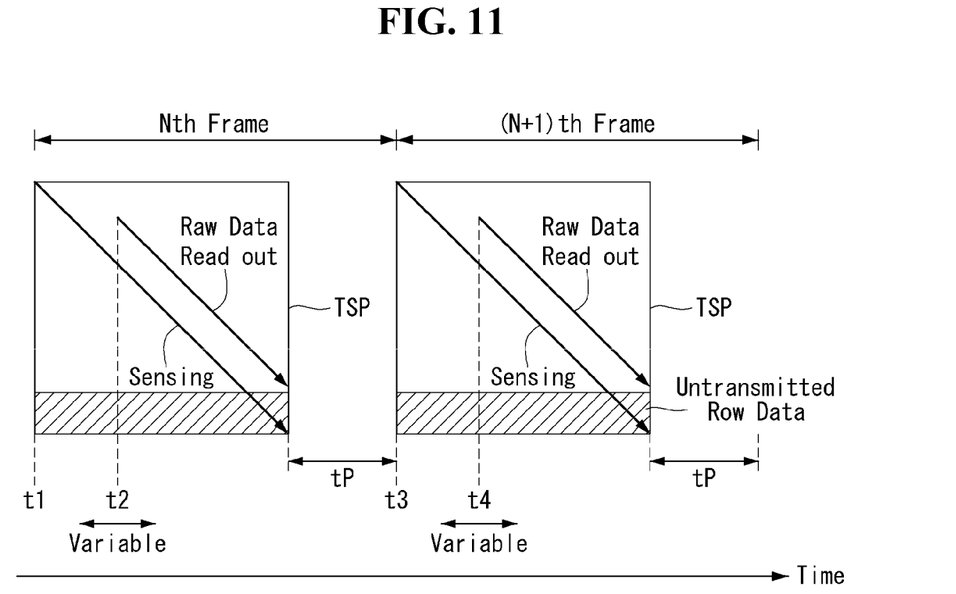
FIG. 11 is a view showing an example in which raw data transmission is omitted when there is an overlap between a sensing period and a raw data transmission period.

The start timings t2 and t4 of raw data transmission periods should be later than the start timings t1 and t3 of sensing periods by taking into account the time required for inactive touch sensors to be activated. The end timing of a raw data transmission period should be later than the end timing of a sensing period. This is because, as shown in FIG. 11, if raw data transmission is finished when there are inactive touch sensors left, some of the raw data is not transmitted to the algorithm execution unit 30. The raw data transmission period may end in an idle period tP. The idle period tP may be a pixel data addressing period or vertical blank period. For pixels embedded in the in-cell type in a pixel array, 1 frame period is time-divided into a pixel data addressing period during which data is written to the pixels and a touch sensor driving period for driving the touch sensors. The vertical blank period is a period between the Nth frame period and the (N+1)th frame period, during which no input image data and data enable signal DE are input.

The host system 30 may vary a raw data transmission period by using an LMK. As shown in FIG. 12, the host system 30 may control the operation sequence of the touch sensing system in the following order: a sensing period, a raw data transmission period, and an algorithm execution period, for example.

As described above, the present invention allows for parallel processing of a sensing operation and a raw data transmission operation by using a buffer memory for which the amount of data storage and the start timing of a read operation are variable.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system, comprising:
a touch screen drive circuit which senses a change in the amount of electric charge in touch sensors during a sensing period, generates raw touch data and temporarily stores it in a buffer memory, transmits the raw touch data read out from the buffer memory to an algorithm execution unit during a raw data transmission period, and calculates the coordinates of touch input by the algorithm execution unit during an algorithm execution period,
wherein the touch screen drive circuit controls the amount of data stored in the buffer memory and the start timing of a read operation to make the sensing period and the raw data transmission period overlap each other.

2. The touch sensing system of claim 1, wherein the amount of data stored in the buffer memory and the start timing of the read operation are variable depending on a store level mark signal externally input into the buffer memory.

3. The touch sensing system of claim 1, wherein the start timing of the raw data transmission period is later than the start timing of the sensing period.

4. The touch sensing system of claim 3, wherein the end timing of the raw data transmission period is later than the end timing of the sensing period.

5. The touch sensing system of claim 4, wherein the algorithm execution period overlaps the next sensing period and the next raw data transmission period.

6. A driving method of a display device, the method comprising:
sensing a change in the amount of electric charge in touch sensors during a sensing period, generating raw touch data, and temporarily storing the same in a buffer memory;
transmitting the raw touch data read out from the buffer memory to an algorithm execution unit during a raw data transmission period; and
analyzing the raw touch data to calculate the coordinates of touch input by the algorithm execution unit during an algorithm execution period,
wherein the amount of data stored in the buffer memory and the start timing of a read operation are controlled to make the sensing period and the raw data transmission period overlap each other.

7. The driving method of claim 6, wherein the amount of data stored in the buffer memory and the start timing of the read operation are variable depending on a store level mark signal externally input into the buffer memory.

8. The driving method of claim 7, wherein the start timing of the raw data transmission period is later than the start timing of the sensing period.

9. The driving method of claim 8, wherein the end timing of the raw data transmission period is later than the end timing of the sensing period.

10. The driving method of claim 9, wherein the algorithm execution period overlaps the next sensing period and the next raw data transmission period.

11. A display device, comprising:
a display drive circuit configured to write a video data of an input image to pixels of a display panel; and
a touch screen drive circuit configured to sense a touch input based on a change in an amount of electric charge in touch sensors,
wherein the touch screen drive circuit generates raw touch data and temporarily stores it in a buffer memory, transmits the raw touch data read out from the buffer memory to an algorithm execution unit during a raw data transmission period, and calculates the coordinates of touch input by the algorithm execution unit during an algorithm execution period,
wherein the touch screen drive circuit controls the amount of data stored in the buffer memory and the start timing of a read operation to make the sensing period and the raw data transmission period overlap each other.

12. The display device of claim 11, wherein the amount of data stored in the buffer memory and the start timing of the read operation are variable depending on a store level mark signal externally input into the buffer memory.

13. The display device of claim 11, wherein the start timing of the raw data transmission period is later than the start timing of the sensing period.

14. The display device of claim 13, wherein the end timing of the raw data transmission period is later than the end timing of the sensing period.

15. The display device of claim 14, wherein the algorithm execution period overlaps the next sensing period and the next raw data transmission period.

16. The display device of claim 11, wherein the touch sensors are embedded in the display panel.

17. The display device of claim 12, wherein the touch screen drive circuit comprises:
a touch timing controller configured to receive the store level mark signal and control an amount of data stored in the buffer memory,
a data transmitter configured to transmit a synchronization signal to the algorithm execution unit to notify a host system of the start timing of data transmission, and start a transmission of the raw touch data received from the buffer memory,
wherein when raw data is stored to an address designated by the store level mark signal, the buffer memory transmits the raw touch data to the data transmitter in a first-in first-out order.

18. The display device of claim 12, wherein the host system controls the amount of data stored in the buffer memory and a timing of raw touch data transmission by using the store level mark signal.

* * * * *